United States Patent [19]

Takimoto

[11] Patent Number: 4,496,998
[45] Date of Patent: Jan. 29, 1985

[54] VIDEO TAPE RECORDER WITH DELAYED CONTROL SIGNAL RECORDING UPON RESTART

[75] Inventor: Hiroyuki Takimoto, Kanagawa, Japan

[73] Assignee: Canon Kabushiki Kaisha, Tokyo, Japan

[21] Appl. No.: 299,180

[22] Filed: Sep. 3, 1981

[30] Foreign Application Priority Data

Sep. 4, 1980 [JP] Japan .................................. 55-122863

[51] Int. Cl.³ ............................................ H04N 5/782
[52] U.S. Cl. .................................. 360/33.1; 360/14.2; 360/70; 360/73
[58] Field of Search ........................ 360/10, 14, 69, 73, 360/74.4, 74.1, 14.1, 14.2, 14.3, 72.2, 33.1, 70, 10.1, 10.2, 10.3; 358/906

[56] References Cited

U.S. PATENT DOCUMENTS

| | | | |
|---|---|---|---|
| 3,968,518 | 7/1976 | Kihara et al. | 360/74.4 X |
| 3,974,522 | 8/1976 | Fukatsu et al. | 358/906 |
| 4,190,869 | 2/1980 | Ota | 360/73 X |
| 4,246,616 | 1/1981 | Hiraguri et al. | 360/74.4 X |
| 4,296,446 | 10/1981 | Zorbalas | 360/73 |
| 4,305,101 | 12/1981 | Yarbrough et al. | 360/69 |
| 4,307,417 | 12/1981 | Tokuyama et al. | 360/10.1 |
| 4,322,755 | 3/1982 | Kosaka | 360/74.4 X |

OTHER PUBLICATIONS

Automatic Assembly Recording System for Helical Scan Type VTR, IEEE Transactions on Consumer Electronics, Fukushima et al., vol. CE-25, Aug. 1979, pp. 448-455.

Primary Examiner—Raymond F. Cardillo, Jr.
Assistant Examiner—Steven R. Garland
Attorney, Agent, or Firm—Toren, McGeady and Stanger

[57] ABSTRACT

An image recording and reproducing apparatus of the present invention has change over means between a running state and a stopped state of a recording medium, operation detecting means to detect an operation state of the change over means by a control signal synchronized either with a reference signal or a vertical synchronizing signal of an image signal, and delay means to have an output from the operation detecting means delayed for a prescribed length of time after a moment of the change over for a start of running of the recording medium or a stopping of the same thus having a running or stopping signal output therefrom. The recording of the control signal on the recording medium is stopped corresponding to the output of the operation detecting means and the output of the delay means. Further when a change over is made from a stopping mode of the recording medium to a running mode thereof after a change over is once made from the running mode to the stopping mode thereof, a recording interval of control signals corresponding to joints in a recording locus on the recording medium is made to be multiples of an integer being 2 or larger of a recording interval of control signals when the medium makes an ordinary run.

5 Claims, 15 Drawing Figures

VIDEO TAPE RECORDER WITH DELAYED CONTROL SIGNAL RECORDING UPON RESTART

BACKGROUND OF THE INVENTION

1. Field of the Invention

The present invention relates to a recording and reproducing apparatus for image signals such as a videotape-recorder (VTR).

2. Description of the Prior Art

VTRs which record video-signals, such as signals of a black and white television and a color television on a magnetic tape and reproduce the same, especially a helical VTR which records video signals for one field element on one oblique track, have been used not only for broadcasting but for home use application and other applications. They are also used in a portable video system together with a simple video camera. When new video signals are to be recorded on a tape while the tape is being run in such helical VTR after video signals are recorded on a portion of the tape or a portion of the tape is reproduced and the tape is stopped once, if intervals of control signals (CTL signals) recorded on a control track are not uniform at joints between a recording locus already formed on the tape and a recording locus subsequently formed thereon, a disturbance in synchronism will take place at the joints as both recording loci are reproduced in succession. This presents an unsightly reproduction.

Various countermeasures have been proposed and put in practical uses for eliminating this phenomenon. For example, in a so-called phases matching system, an apparatus has been proposed such that when a tape is changed over from a running mode to a stopped mode, a certain amount of tape is rewound and then is stopped, and as a next recording is started, first, after the apparatus is started with a reproduction mode, a change over is not immediately made to a recording mode. Instead a driving adjustment of a capstan is made before shifting to a next recording mode, so that phases of control signals for a next recording and control signals for reproduction match each other at this time.

In this method, the apparatus needs to make a series of sequence actions running→rewinding→stopping and stopping→synchronizing in reproduction→recording, and means to enable the capstan to make positive and reverse rotations will be necessary, thus a mechanism and circuit will become complicated, increasing manufacturing cost thereof. Also, since the tape is rewound for a prescribed amount, there are shortcomings that other video signals are recorded on the previous recording locus and other previous recordings are erased.

As a simpler method than this phases matching system, a so-called timing phases system has recently been used for a home use VTR, etc. This system has a circuit to detect a timing of a control pulse immediately after a change over action to change over a tape from a running state to a stopped state or in a reverse, and a delay circuit to delay an output from said detection circuit for a length of time as corresponding to a mechanical delay in a tape driving system. The tape driving system is controlled by an output of the delay circuit so that the tape is changed over from a running state to a stopped state or in a reverse thereto in synchronism with a control signal pulse. In this system, both mechanical down time from a running state to a stopped state and a mechanical rise time from a stopped state to a running state need to be sufficiently small compared to a cycle of frames. Therefore, an apparatus using this system has many restrictions in mechanical designing and requires close and fine care and control in assembly operations. In addition, adjustments of respective delay circuit for the change over from the running to the stopped state and from the stopped to the running state are difficult.

SUMMARY OF THE INVENTION

An object of the present invention is to provide an image recording and reproducing apparatus which can prevent disturbance in an image plane at a time of reproduction by a simple arrangement when a recording is stopped once and then, a next recording is to be made.

Another object of the present invention is to provide an image recording and reproducing apparatus which can function properly in practical use even if a responsive speed of a tape driving system is comparatively slow.

A further object of the present invention is to provide an image recording and reproducing apparatus in which adjustments can be made in comparatively simple manner and disturbances in an image plane at a time of reproduction can be prevented.

Since a recording of control signals is stopped in synchronism with a synchronizing signal when a running of a recording medium is stopped in an example of the present invention, recording intervals of said control signals can be freely set. Therefore, a control of a recording medium running system can be made without giving a special restriction to the running system and without a deviation in a track, etc. Also adjustments of responsive characteristics in the recording medium running system can be made in a comparatively simple manner.

Also, the present invention has a special feature in that a response of a recording medium running system does not have to be made faster since a pitch of a control signal is made to be multiples in a plurality of an ordinary pitch so that it will be fitted to a responsive characteristic of the running system in an example of the invention.

BRIEF DESCRIPTION OF THE DRAWINGS

FIGS. 5(i) and 5(ii) are diagrams to show CTL signal patterns at joints recorded on a tape by a VTR of the present invention.

DESCRIPTION OF THE PREFERRED EMBODIMENTS

Now, the present invention shall be explained in detail referring to the accompanying drawings.

Figure 1:
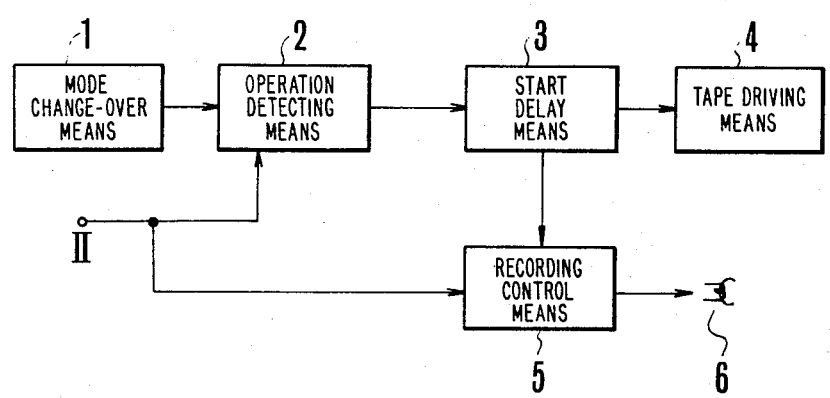
FIG. 1 is a block diagram to show an example of a VTR control change over apparatus according to the present invention.

FIG. 1 is a block diagram to show an example of a control change over apparatus for a VTR according to the present invention, wherein 1 is mode change over means, and 2 is operation detecting means, while 3 is a start delay means. What is shown as 4 is tape driving means, and CTL (control) recording control means 5 are synchronized by synchronizing signals (vertical synchronism) from a terminal II, and control signals generated at an output of the means 5 are recorded on a control track of a tape by a CTL head 6.

Figure 2:
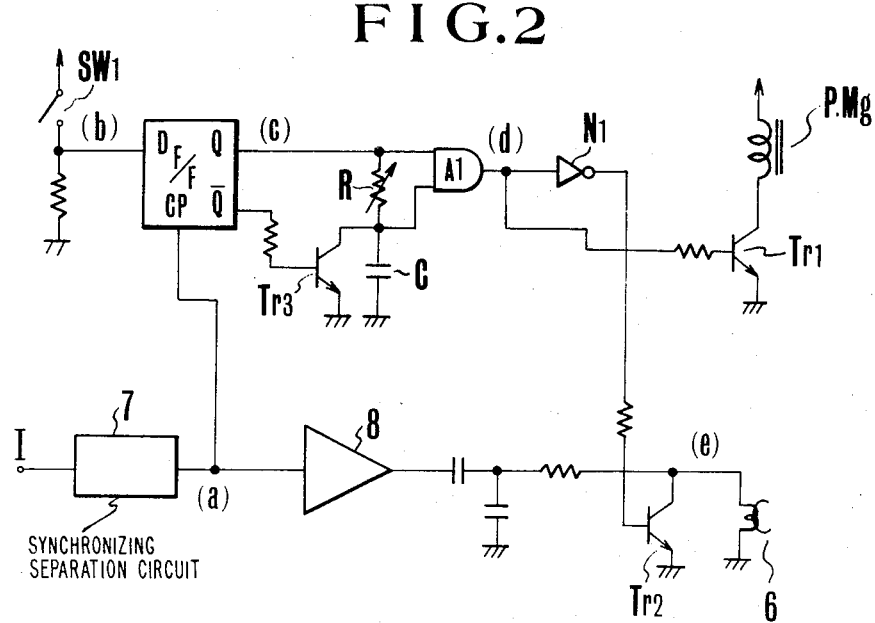
FIG. 2 is a circuit connection diagram of the apparatus shown in FIG. 1.

FIG. 2 is a circuit connection diagram to show an example of the apparatus of the present invention shown in FIG. 1. In this drawing, $SW_1$ is a switch which becomes ON.OFF in an association with a change over operating member (not being shown in the drawing) and becomes ON when said operating member is placed in a recording mode and becomes OFF when the same is in a stopped mode. What is shown as PMg is a magnet which is used to control the pinch roller pressure contacted with or separated from a capstan for tape driving, and has the pinch roller pressure contacted with the capstan to run the tape when the magnet is excited, and the pinch roller is placed in a separated state when the magnet is demagnetized. Thus, the tape running is stopped. Compound image signals including synchronizing signals input from a terminal I have vertical synchronizing signals thereof separated by a well known type of a synchronizing separation circuit 7, then the vertical synchronizing signals are amplified by a recording amplifier 8 and are impressed to a control head CTL, thus control signals (CTL signals) will be recorded on the control track of the tape.

Figure 3:
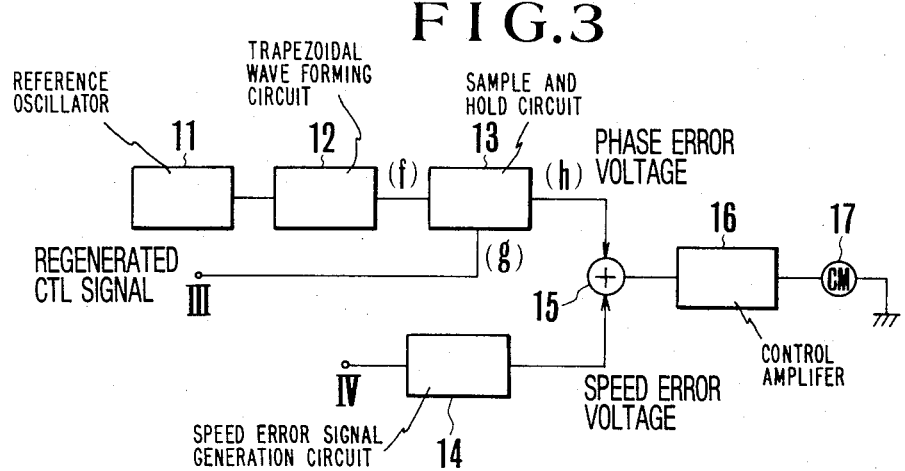
FIG. 3 is a block diagram to show an example of a capstan servo at a time of reproduction in a VTR of the present invention.

Next, FIG. 3 is a block diagram to show an example of a capstan servo at a time of reproduction of a VTR according to the present invention. In this drawing, 11 is a reference oscillator, and 12 is a trapezoidal wave forming circuit, while 13 is a sample and hold circuit. What is shown as 14 is a speed error signal generation circuit, and 15 is an addition circuit, while 16 is a control amplifier, further 17 is a capstan motor, and a terminal III is a reproduction CTL signal input terminal, while IV is a capstan FG (frequency generator) input terminal to show a rotation cycle of the capstan. As known well, a capstan servo at a time of reproduction consists of a speed control servo by a capstan FG and a phase control servo by a phase difference between a signal from the reference oscillator 11 and a CTL signal recorded on the tape at a time of recording. Signals from the reference oscillator 11 are made into trapezoidal wave signals by the trapezoidal wave forming circuit 12, and an oblique portion thereof is sampled at the sample and hold circuit 13 by a reproduction CTL signal, then is held thereat, and the phase difference between the reference oscillator and the reproduction CTL signal is converted to a voltage value. This will be output as a phase error voltage. The phase error signal and a speed error signal made at the speed error generation circuit 14 by the capstan FG input are added by the circuit 15 and is impressed on the capstan motor 17 through the control amplifier 16.

Figure 4:
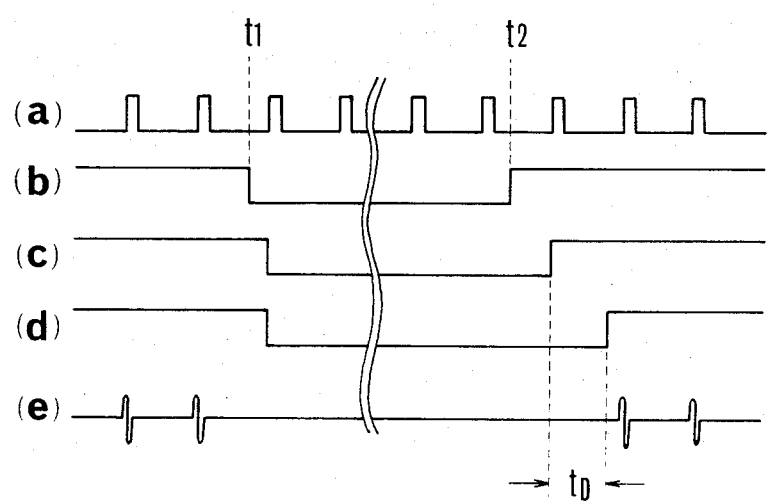
FIG. 4 is a waveform diagram consisting of a–e to showing a timing chart of the circuit shown in FIG. 2.
Figure 5:
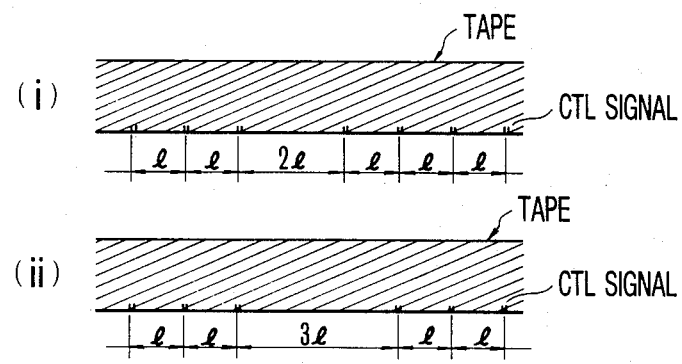

FIG. 4 is a waveform diagram to show a timing chart of the circuit shown in FIG. 2. Also FIG. 5 is a diagram to show patterns of CTL signals at a joints recorded on the tape by VTR of the present invention.

Next, function of the apparatus of the present invention shown in FIG. 2 shall be explained referring to FIG. 4. In FIG. 4, in a state where a sufficient length of time has elapsed from a time an operating member (not being shown in the drawing) is set at a recording mode and the switch $SW_1$ is made ON, image signals are recorded on the tape and the magnet PMg is at an excited state, while a tape running is continued. At this time, the control signal CTL will be recorded on the control track with a certain constant interval l as shown in FIG. 5.

Now, the operating member is changed over from a recording mode to a stopped mode at a time $t_1$. By this, the switch $SW_1$ is made OFF and D input of a D type Flip-Flop F/F is changed from H (high level) to L (low level) (time $t_1$ in FIG. 4(b)). On the other hand, the vertical synchronizing signals being synchronizingly separated from the image signals are clock input of said F/F (FIG. 4(a)), and Q output of F/F becomes L from H in synchronism with said vertical synchronizing signals (FIG. 4(c)). Therefore, an output of an AND gate $A_1$ becomes L, and NPN transistor $Tr_1$ is placed in OFF state, then power supply to PMg is shut off and the pinch roll is separated from the capstan. The tape will be placed in a stopped state after an elapse of a certain mechanical delay time from a moment the power supply to PMg is discontinued. Also, since an output of an inverter $N_1$ which takes an output of the AND gate $A_1$ as an input thereinto becomes H from L, NPN transistor $Tr_2$ is placed in ON state from OFF state. While, the image signals are continuously input from the terminal I even when the tape is placed in a stopped state and CTL signal is amplified and output from the recording amplifier 8 at that time, $Tr_2$ is in ON state, therefore the CTL signal will not be recorded on the tape (FIG. 4(e) $t_1$ to $t_2$). When the operating member is set at the recording mode from the stopped mode again at a time $t_2$ after an elapse of any length of time, $SW_1$ is changed from OFF to ON and D input of the Flip-Flop F/F becomes H from L (FIG. 4(b), time $t_2$). Next, the vertical synchronizing signals being separated from the image signals are added to clock input CP, and Q output changes from L to H and $\overline{Q}$ output changes from H to L. While, NPN transistor $Tr_3$ is in ON state as $\overline{Q}$ output is at H and a capacitor C is completely discharged, when the Q output changes to H and the $\overline{Q}$ output changes to L, the transistor $Tr_3$ becomes OFF state, and charging current flows into the capacitor C through a resistor R. At this time, while an input at one side of the AND gate $A_1$ to which the Q output is connected is H, an input at the other side connected to a CR time constant circuit will have a delay in becoming H for such prescribed period of time ($\tau D$ in FIG. 4) determined by CR time constant from the moment the Q output becomes H, and the output of the AND gate $A_1$ changes from L to H after an elapse of $\tau D$ time from the moment the Q output changes to H from L. When the output of the AND gate $A_1$ becomes H, the transistor $Tr_2$ is placed in OFF state and the CTL head starts recording of CTL signals again.

On the other hand, the transistor $Tr_1$ becomes in the ON state, and the PMg is placed in an electrified state, while the pinch roller is pressure contacted with the capstan again and the tape is placed in a running state. Here, the above-mentioned time constant $\tau D$ is so set that the CTL signal on the tape after recording—stopping—recording cycle will become as shown in FIG. 5. Also, when a mechanical delay from a moment the PMg is placed in a non-conductive state till the moment the tape running is stopped is comparatively small, the $\tau D$ is so set that an interval of the CTL at a joint will be twice longer (2l) of an ordinary interval as shown in FIG. 5(i). When the mechanical delay is comparatively large, the τD is so set that the interval become three times longer (3l) as shown in FIG. 5(ii). While, tape running and stopping is controlled by a pressure contacting and separation of the pinch roller in the above example, this can be done for example, by a rotation and stopping of the capstan motor. In this case, a mechanical delay time from a moment of a stopping signal to the capstan motor till an actual stopping of a tape running will be longer than that in a running.stopping control by a pressure contacting.separation of the pinch roller, and in this case, the CTL interval at a joint should be so set as being four times or five times . . . longer than that in an ordinary running of tape.

Explanation shall be made on a capstan servo in a case where the joints thus recorded are reproduced in succession.

Figure 6:
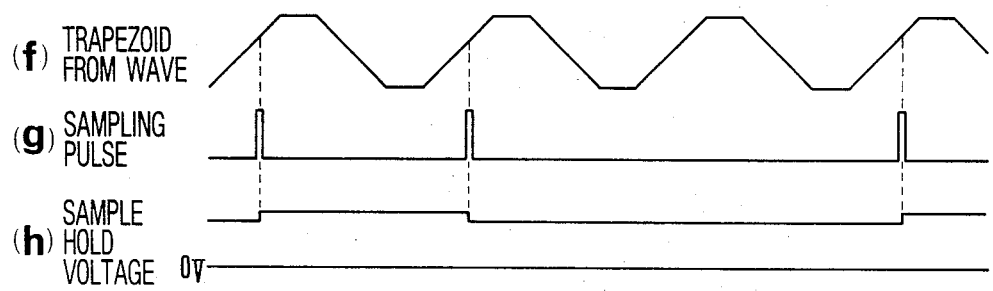
FIG. 6 is a waveform diagram to show a timing chart of a capstan servo in a VTR of the present invention.

Sampling pulse shown in FIG. 6 is a reproduction CTL signal. When a recording tape shown in FIG. 5(i) is continuously reproduced, a sampling will not be made for one time.

However, since a sample hold voltage by a previous sampling is held as it is, the voltage thereof is almost same as the voltage at a time if the sampling should have been made. Thus, a phase deviation at one frame at which the sampling is not made is very slight and will affect a reproduced image only slightly. And a phase against a trapezoidal wave in a next sampling pulse will not be varied but only little from that before the joint as an interval of the sampling pulse is in multiples in an integer. Thus, synchronism will not be largely disturbed.

While, the recorded CTL signals are vertical synchronizing signals separated from image signals in the above example, same features can be obtained in a VTR in which an output from a reference oscillator is recorded as CTL signals. Also, the CTL recording signal and the synchronizing signal of an operation detecting means may be different from each other (for example, a vertical synchronizing signal for CTL recording, while an output signal of an oscillator is used as a synchronizing signal for operation detection). Also means to stop a recording of image signals by a video head also during a period of time the CTL recording is stopped may be used. By this, not only a synchronism disturbance will not be generated at a time of continuous reproduction of joints, but also a momentary disturbance of a reproduced image itself can be made practically unnoticeable.

Figure 7:
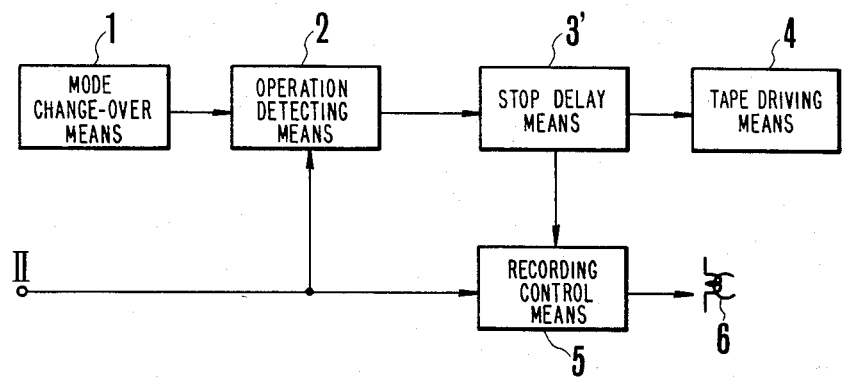
FIG. 7 is a block diagram to show another example of the present invention.
Figure 8:
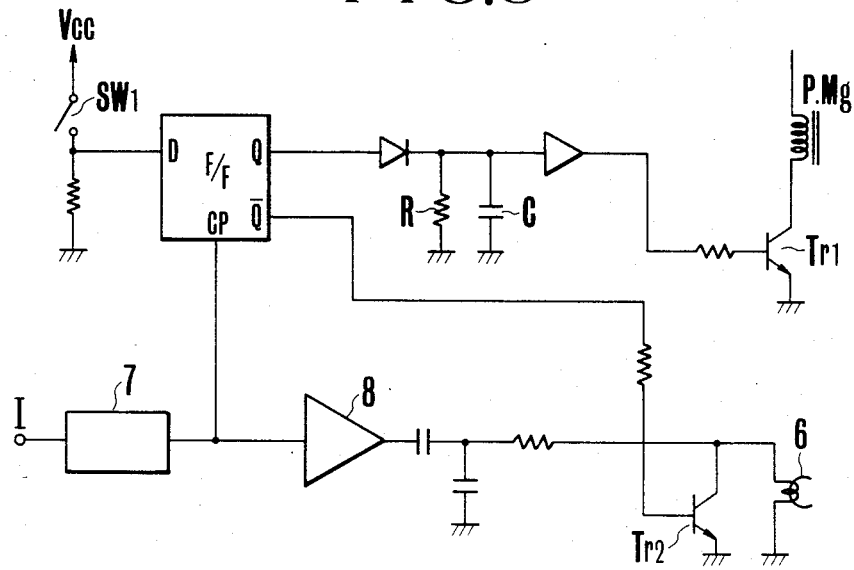
FIG. 8 is a circuit connection diagram of the apparatus shown in FIG. 7.

While, a change over from a stopping of a tape to a running thereof is delayed in the above example, similar effect may be also obtained as a matter of course by delaying a change over from a running to a stopping. FIG. 7 and FIG. 8 are block diagram and a circuit connection diagram respectively to show another example of the present invention in which a change over from a running to a stopping is delayed, wherein the start delay means 3 in FIG. 1, FIG. 2 are placed by the stop delay means 3'. In FIG. 8, components shown by the same marks as those in FIG. 2 show same members. What is different from FIG. 2 is that Q output of the Flip-Flop F/F is connected to a base of the transistor $Tr_1$ being connected in series to the magnet PMg for controlling a pinch roller through a delay circuit consisting of a capacitor C and a resistor R. Also an arrangement that $\overline{Q}$ output of the Flip-Flop is directly connected to a base of the transistor $Tr_2$ is different from wherein in FIG. 2.

Now, function of the circuit shown in FIG. 8 shall be explained. When the tape is changed over from a running state ($SW_1$: ON) to a stopped state ($SW_1$: OFF), D input of the Flip-Flop F/F changes from H to L, and Q, $\overline{Q}$ terminals thereof become respectively L, H levels in synchronism with the synchronizing signals being input from the terminal I. By this current to the CTL head 6 will be shunt and the recording of the CTL signal is stopped, and at the same time, after an elapse of CR time constant the transistor $Tr_1$ becomes OFF and the magnet PMg is placed in a non-active state releasing the pressure contact of the pinch roller. Also, when the switch $SW_1$ is made ON from said stopped state, H, L levels are output respectively at the Q, $\overline{Q}$ terminals of the Flip-Flop F/F in synchronism with a synchronizing signal immediately thereafter. By this, a recording by the CTL head 6 can be done immediately and at the same time the transistor $Tr_1$ becomes ON after an elapse of a prescribed length of time determined by CR time constant, then the magnet PMg works and the pinch roller is made to pressure contact with an axle of the capstan through a tape not being shown in the drawing.

Also, in the example shown in FIG. 8, more stable reproduced image can be obtained by suitably selecting CR time constant in relation to responsive characteristics of a running system.

Also, according to the purport of the present invention a recording medium is not limited to a tape, instead similar effect can be achieved irrespective of a type of a recording medium as long as an apparatus is of a type that a recording is made as a recording medium itself is shifted.

As has been explained in detail in the above examples, in an image recording and reproducing apparatus of the present invention, intervals of control signals at joints of tape runnings and stoppings are made to be multiples in plurality of intervals at a time of an ordinary running by stopping a recording by a CTL head at a time when a driving of a recording medium such as a tape is stopped, thus satisfactory reproduced images without synchronizing disturbance can be obtained even when joints are continuously reproduced, thus great effects can be obtained by a simple circuit arrangement, and it can be made an apparatus especially suitable for a helical VTR such as a home use one.

What is claimed is:

1. A video signal recording and reproducing apparatus, comprising:
   (a) carrying means which carries a recording medium at a predetermined speed during a video signal recording and reproducing mode;
   (b) changeover means for forming signals for starting or stopping carrying actions of the carrying means;
   (c) signal forming means for forming control signals which serves as a reference in a running speed control of said carrying means at a time of reproduction of video signals;
   (d) recording means for recording said control signals on a recording medium during the video signal recording mode;
   (e) prohibiting means for prohibiting the recording of said control signals during a period of time from the stopping of the carrying action until a restarting of the same in the video signal recording mode; and
   (f) delay means for making the carrying means to restart the carrying action after the elapse of a prescribed delay time from the forming of the control signal after the forming of the start signal;

wherein said delay means includes means for setting said delay time so that an interval on the recording medium of the last control signal recorded before the stopping of the carrying action and the first control signal recorded after the restart of the carrying action is two or more times greater than the distance between two previously recorded control signals recorded when said recording medium is driven with said predetermined speed.

2. An apparatus according to claim 1, wherein the recording medium has the form of a long tape.

3. An apparatus according to claim 2, wherein the signal forming means provides for recording of the control signals on an edge portion of said long tape recording in the widths direction.

4. An apparatus according to claim 1, wherein the carrying means includes a pinch roller, a capstan roller, and means for controlling the pinch roller with the capstan roller.

5. A video signal recording and reproducing apparatus, comprising:
 (a) carrying means which carries a recording medium at a predetermined speed during a video signal recording and reproducing mode;
 (b) changeover means for forming signals for starting or stopping carrying actions of the carrying means;
 (c) signal forming means for forming control signals which serves as a reference in a running speed control of said carrying means at a time of reproduction of video signals;
 (d) recording means for recording said control signals on a recording medium during the video signal recording mode;
 (e) prohibiting means for prohibiting the recording of said control signals during a period of time from the stopping of the carrying action until a restarting of the same in the video signal recording mode; and
 (f) delay means for making the carrying means to stop the carrying action after the elapse of a prescribed delay time from the forming of the control signal after the forming of the stop signals;

wherein said delay means includes means for setting said delay time so that an interval on the recording medium of the last control signal recorded before the stopping of the carrying action and the first control signal recorded after the restart of the carrying action is two or more times greater than the distance between two previously recorded control signals recorded when said recording medium is driven with said predetermined speed.

* * * * *